United States Patent
Thompson et al.

(10) Patent No.: US 10,801,253 B2
(45) Date of Patent: Oct. 13, 2020

(54) END LOAD ARM

(71) Applicant: ASSA ABLOY Accessories and Door Controls Group, Inc., New Haven, CT (US)

(72) Inventors: Melissa Thompson, New Haven, CT (US); Douglas Thompson, Somerset, PA (US); Kyle R. Murray, Somerset, PA (US)

(73) Assignee: ASSA ABLOY Accessories and Door Controls Group, Inc., New Haven, CT (US)

( * ) Notice: Subject to any disclaimer, the term of this patent is extended or adjusted under 35 U.S.C. 154(b) by 54 days.

(21) Appl. No.: 16/141,116

(22) Filed: Sep. 25, 2018

(65) Prior Publication Data

US 2019/0234134 A1 Aug. 1, 2019

Related U.S. Application Data

(60) Provisional application No. 62/625,225, filed on Feb. 1, 2018.

(51) Int. Cl.
*E05D 5/02* (2006.01)
*E06B 3/36* (2006.01)
*F16M 13/02* (2006.01)

(52) U.S. Cl.
CPC .............. *E06B 3/36* (2013.01); *F16M 13/02* (2013.01)

(58) Field of Classification Search
CPC .. E05Y 2600/626; E05F 3/227; E05D 5/0246; E05D 7/081; E06B 33/36
See application file for complete search history.

(56) References Cited

U.S. PATENT DOCUMENTS

| | | | | |
|---|---|---|---|---|
| 2,545,378 A | * | 3/1951 | Peck | E05D 7/081 16/243 |
| 3,089,183 A | * | 5/1963 | Martin | E05F 1/12 16/49 |
| 3,101,507 A | * | 8/1963 | Cecala | E05D 7/081 16/241 |
| 3,115,665 A | * | 12/1963 | Cecala | E05D 7/081 16/241 |
| 3,148,407 A | * | 9/1964 | Glasbrenner | E05D 7/081 16/236 |
| 3,299,576 A | * | 1/1967 | Bobrowski | E05F 15/614 49/501 |
| 3,694,852 A | * | 10/1972 | Jentsch | E05F 3/00 16/236 |
| 3,726,043 A | * | 4/1973 | Jentsch | E05F 3/00 49/388 |
| 4,996,740 A | * | 3/1991 | Hales, Sr. | E05F 3/225 16/273 |
| 5,203,115 A | * | 4/1993 | Marinoni | E05D 5/0246 16/236 |
| 6,058,665 A | * | 5/2000 | Halvorson, Jr. | E05D 15/48 49/159 |

(Continued)

*Primary Examiner* — Bradley Duckworth
(74) *Attorney, Agent, or Firm* — Wolf, Greenfield & Sacks, P.C.

(57) ABSTRACT

An end load arm for a glass door rail couples the glass door rail to mounting hardware. The end load arm may allow a glass door to be installed at an angle which does not block the doorway during installation. The end load arm may be suitable for use in low-profile glass door rails.

18 Claims, 6 Drawing Sheets

(56) References Cited

U.S. PATENT DOCUMENTS

| | | | |
|---|---|---|---|
| 6,511,120 B1 * | 1/2003 | Mitts | E05D 5/0207 |
| | | | 16/382 |
| 7,380,378 B2 * | 6/2008 | Clifford | E06B 3/02 |
| | | | 52/127.8 |
| 8,528,169 B1 | 9/2013 | Yu | |
| 8,578,556 B1 | 11/2013 | Yu | |
| 8,578,557 B2 | 11/2013 | Yu | |
| 2004/0034968 A1 * | 2/2004 | Williams | E05D 3/122 |
| | | | 16/354 |

\* cited by examiner

END LOAD ARM

This Application claims the benefit under 35 USC 119(e) of U.S. Application Ser. No. 62/625,225, filed Feb. 1, 2018, titled "END LOAD ARM", which is hereby incorporated by reference in its entirety.

FIELD

Disclosed embodiments are related to glass door mounting arrangements.

BACKGROUND

In one conventional practice of installing glass doors, a glass door e and the door frame are drilled to form a number of hinge holes in which a hinge is fastened with screws such that the door piece can be pivotally turned relative to the door frame by the hinge. However, since tolerance errors usually occurs during the drilling of the holes, if the hinge is still forced to be fastened on the holes under such condition, the door piece of the glass door would not be aligned with the door frame and misalignment therefore occurs as a result. To address this issue, some conventional glass doors are mounted with rails or patch fittings, which hold the glass door pane along an external top and bottom edge. The rails or patch fittings are typically mounted to a load arm which connects the rails or patch fittings to a pivot which allows the glass door to swing.

SUMMARY

An end load arm for a glass door rail. The end load arm includes a main body, a cap, and at least two cap fasteners. The main body includes at least two cap fastener holes located on a longitudinal end of the main body. The cap includes at least two through holes. Each cap fastener is constructed and arranged to be received by a corresponding through hole and by a corresponding cap fastener holes to attach the cap to the main body. A ratio between a maximum height of the end load arm and a maximum width of the end load arm is between 2:5 and 3:5 or approximately equal to one of 2:5 and 3:5.

An end load arm for a glass door rail. The end load arm includes a main body, a cap, and at least two cap fasteners. The main body includes at least two cap fastener holes located on a longitudinal end of the main body. The cap includes at least two through holes. Each cap fastener is constructed and arranged to be received by a corresponding through hole and by a corresponding cap fastener holes to attach the cap to the main body. The main body also includes a first section forming the end of the main body. The ratio between the length of first section and a maximum length of the main body is between 1:5 and 2:5 or approximately equal to one of 1:5 and 2:5.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
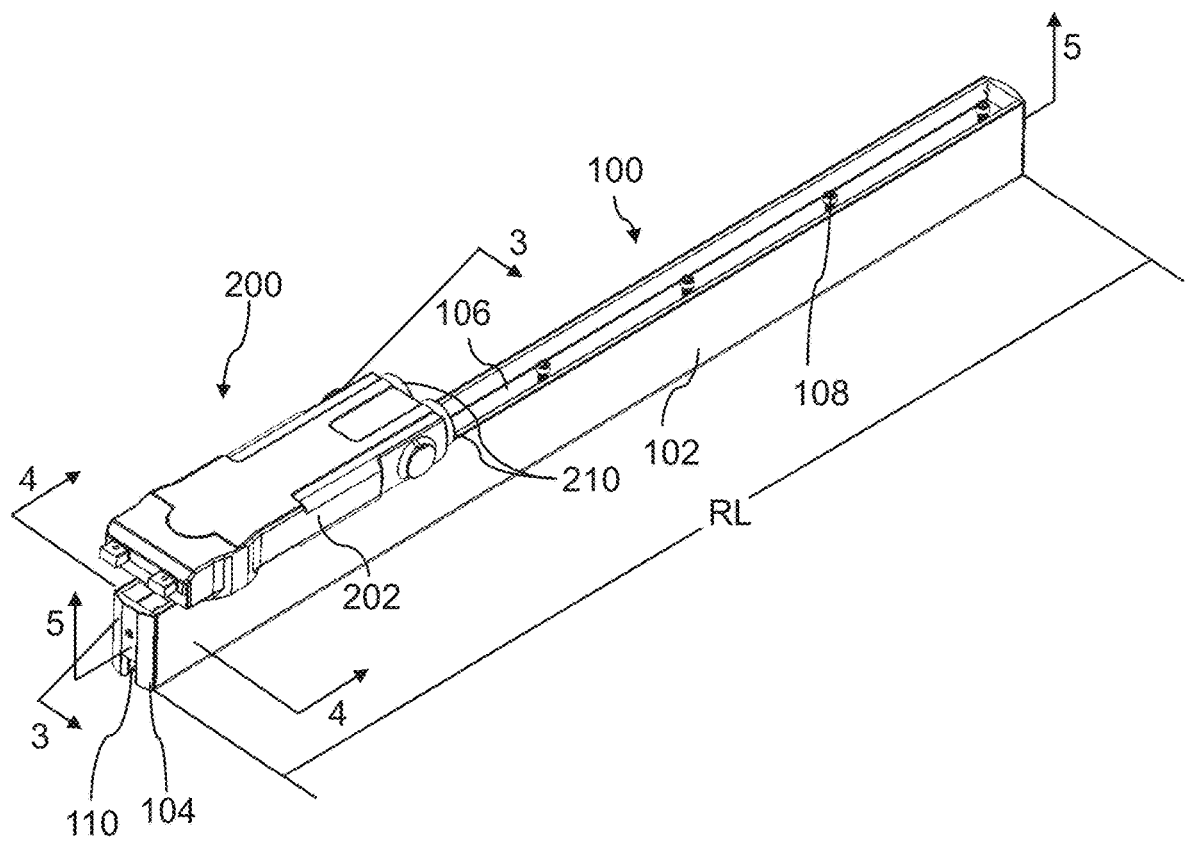
FIG. 1 is a perspective view of one embodiment of a glass door rail assembly.

In order to mount a glass door to a hinge, to a pivot or to other mounting hardware, a load arm may be used. Conventional load arms include a body with a slot in the side and a cap which is arranged to cover the slot and capture a spindle of a hinge or other door hardware including a door closer. When mounted to the spindle of a door closer or other mounting hardware, the glass door is typically mounted from an orientation or direction representing the closed position of the door. That is, a glass door is installed such that it blocks the doorway when it is being installed. With typical load arms, a glass door with the load arm will be placed into the doorway such that the spindle of the door closer is captured in the slot in the body of the load arm and afterward the slot will be closed by the cap such that the spindle is secured inside of the load arm. Thus, for traditional load arms, access must be provided to the slot during installation which may be cumbersome especially when the door is being installed in the door-closed orientation.

Conventional glass door rails use high-profile (i.e., tall) door rails to mount a glass door pane and provide space for a load arm to connect the door rails to mounting hardware. The tall door rails are arranged to withstand the high forces involved with hanging and operating a glass door. However, it may be desirable to reduce the height of a glass door rail such that the glass door rail occupies less space. Such low-profile glass door rails may improve aesthetic appearance, such that a greater percentage of the door area is made up of a glass door pane as opposed to the door rails.

In view of the above, the inventors have recognized the benefits of a low-profile load arm which may be used in small glass door rails, without sacrificing operability or strength, and the benefits of a load arm which loads from the end so that the door may be mounted from the end without blocking a doorway, thereby improving ease of installation. It should be noted that while the embodiments described here refer to a door rail, the present disclosure is not so limited and aspects disclosed herein relate equally to a patch fitting. As such, the term "door rail" is used herein interchangeably with the term "patch fitting".

According to one embodiment of the present disclosure, an end load arm may include a main body having a recess to receive a spindle of the closer and a cap to secure the spindle in the recess. The main body may include at least two cap fastener holes positioned on a longitudinal end of the main body and the cap may include at least two through holes. Fasteners are inserted through the cap holes to secure the cap to the main body, holding the spindle in the recess. A ratio between a maximum height of the end load arm and a maximum width of the end load arm may be between 2:5 and 3:5, or approximately equal to 2:5, or approximately equal to 3:5. Without wishing to be bound by theory, such an arrangement may allow the end load arm to cooperate with a low-profile glass door rail.

In one embodiment, the end load arm is configured with two fasteners on each of two opposite sides of the spindle recess. Without wishing to be bound by theory, the two fasteners on each side of the spindle recess to secure the cap to the main body and thus the spindle within the recess may act to distribute the forces involved from hanging and swinging a door evenly in an otherwise low-profile end load arm.

The end load arm may include two sections: a first section configured one longitudinal end of the end load arm to capture the spindle and the second section configured to mount to the door rail. The first section may be taller than the second section to substantially capture an entire height of a spindle. The length of the first section relative to the overall length of the end load arm may be between 1:5 and 2:5, or approximately equal to 1:5, or approximately equal to 2:5. In some embodiments, an end load arm may have a ratio of a maximum length of the end load arm and a maximum length of a cooperating door rail between 1:20 and 3:20, or approximately equal to 1:20, or approximately equal to 1:30. In yet another embodiment, the end load may have a maximum length less than or approximately equal to 5.125 inches.

The end load arm may be closely fit within an interior space of a glass door rail. Such an arrangement may allow the end load to be centered in the door rail so that no further later alignment or adjustment of the door needs to be completed by an installer. Thus, an end load arm with a maximum width approximately equivalent to an internal width of a glass door rail may simplify and reduce the expense of installation and alignment of glass doors. Additionally, such an arrangement may also reduce the number of fasteners used to secure the end load arm to the glass door rail. Without wishing to be bound by theory, by fitting closely with a glass door rail, the end load arm may transfer lateral loads and torques imparted from normal operation of the glass door. That is, rather than transferring shear loads through one or more fasteners, the end load arm directly transfers lateral forces or torques from the glass door rail or mounting hardware. Accordingly, the end load arm may reduce wear on one or more fasteners used to secure the end load arm to the glass door rail or reduce the number of fasteners required to withstand the loads encountered by the end load arm during normal glass door operation. In another embodiment, a spacer may fit between the end load arm and the rail to accommodate any space between the two.

The main body of the end load arm may include at least one rail slot constructed and arranged to receive a rail fastener so that the main body may be adjusted in a longitudinal direction relative to a cooperating glass door rail. That is, after the rail slot has received a rail fastener, the main body may be moveable in a longitudinal direction (i.e., along the width of the door frame) such that the end load arm may be positioned relative to any installed mounting hardware on a door frame. Once the rail fasteners are tightened, the main body is substantially stationary secured relative to the glass door rail. During installation, an installer may partially insert the rail fastener into the rail slot, whereupon the installer may adjust the main body in a longitudinal direction to a suitable position for door installation. Subsequently, the installer may fully secure the rail fastener to the rail through the rail slot, such that the main body remains substantially stationary in a longitudinal direction relative to the glass door rail. Such an arrangement may simplify glass door alignment with a doorway.

The end load arm may be formed of steel, such as stainless steel, such that the size of the end load arm may be reduced without compromising strength. Of course, the end load arm may be made out of any suitable material, as the present disclosure is not so limited.

FIG. 1 is a perspective view of one embodiment of a glass door rail assembly including a glass door rail 100 cooperating with a door closer 200 and an end load arm (not shown in the figure). The door rail includes a side rail 102, end cap 104, hardware channel 106, at least one door fastener 108, and a glass slot 110. The side rail and end cap are constructed and arranged to form an exterior surface of the glass door rail. The hardware channel is constructed and arranged to receive and secure any mounting hardware for the door, including, but not limited to, closers, locks, pivots, etc. The at least one door fastener may be disposed within the hardware channel, and may be constructed and arranged to be manipulated to secure a glass door pane (not shown in the figure) in the glass door rail. The glass slot may be arranged to receive the glass door pane which may secured by the at least one door fastener. The glass slot may include any suitable clamp, lock, catch, etc. for receiving the glass door pane. In some embodiments, the glass slot may have an adjustable width which is modified by manipulation of the at least one door fastener. According to this embodiment, a glass door pane may be received by the glass slot, and the at least one door fastener may be manipulated to reduce the width of the glass slot, thereby clamping the glass door pane inside of the slot and securing it. Of course, the glass door slot and the at least one door fastener may have any suitable arrangement such that a glass door pane may be received by the glass door slot and the at least one door fastener may be manipulated to secure the glass door pane to the glass door rail.

According to the embodiment depicted in FIG. 1, the glass door rail assembly includes a door closer 200 cooperating with the glass door rail 100 and an end load arm (not shown in the figure). The door closer includes a casing 202 and at least one spring cylinder 210. The casing may be constructed and arranged to be mounted in an associated door frame, such that the door closer serves as a mounting point for the glass door rail to the associated door frame. The at least one spring cylinder may be disposed in the casing, and constructed and arranged to hold one or more springs (not shown in the figure). The at least one spring cylinder may be further arranged to secure one side of the one or more springs to the casing, such that the spring cylinder resists forces generated by the one or more springs. In some embodiments, the door closer may include a spindle and a spindle lever (not shown in the figure). The spindle may be operatively coupled to the spindle lever, and constructed and arranged to project out of the door closer casing to attach to the end load arm of the glass door rail. For example, a spindle coupled to a glass door rail may be directly coupled to the spindle lever such that rotation of the spindle lever creates an approximately equal rotation in the spindle. According to this example, the spindle lever may be constructed and arranged to attach to a second side of the one or more springs and resist a change in position of the spindle lever. Thus, the one or more springs may resist a change in position of the door, thereby automatically closing the door if it is opened. In some embodiments, a spring cylinder may include a damping mechanism (e.g., friction damper, viscous damper, etc.). Without wishing to be bound by theory, such an arrangement may allow a door to return to a resting position in a controlled manner without excessive swinging. Of course, the door closer may employ any suitable arrangement to close the door, as the present disclosure is not so limited.

Figure 2:
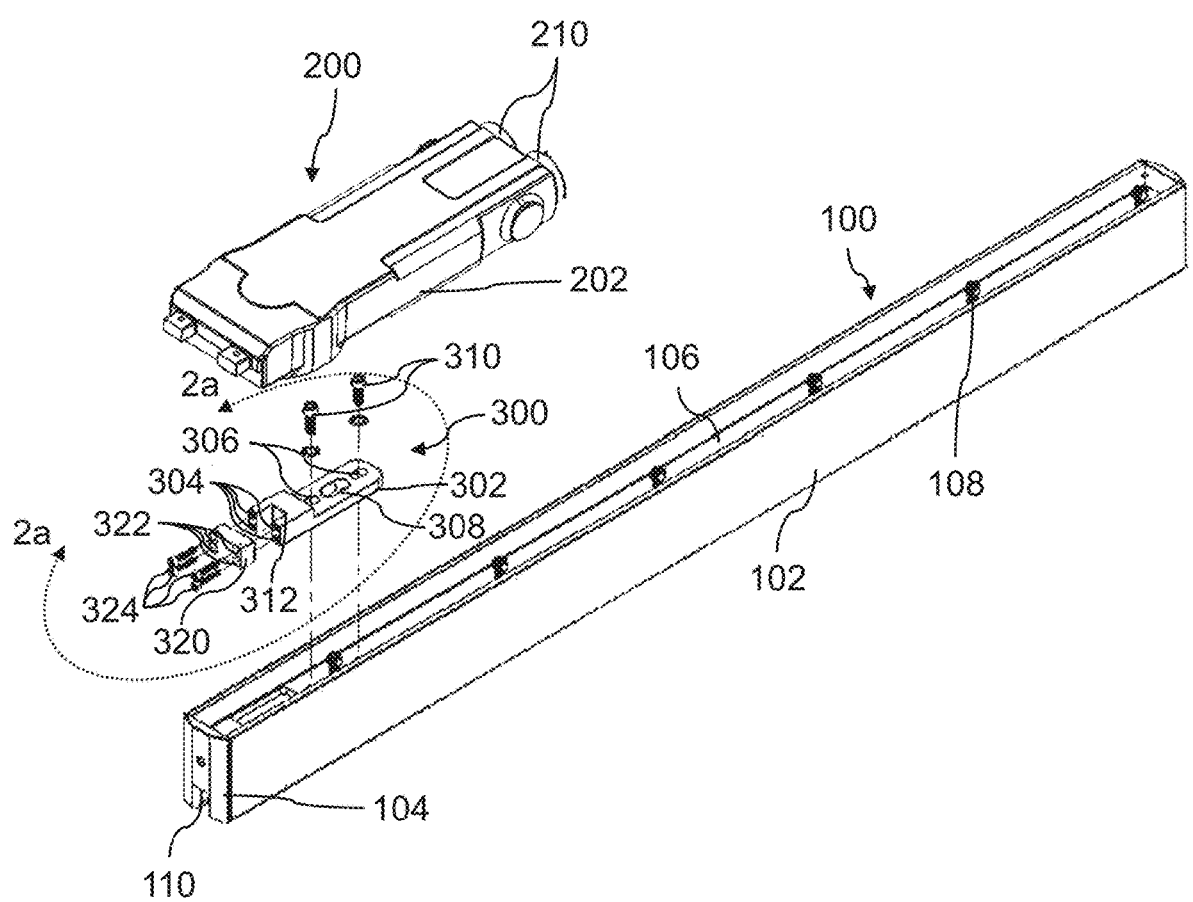
FIG. 2 is an exploded perspective view of the glass door rail assembly of FIG. 1.

FIG. 2 is an exploded perspective view showing the glass door rail assembly of FIG. 1 including the glass door rail 100, door closer 200, and an end load arm 300. According to the depicted embodiment, the door closer is coupled to the glass door rail by the end load arm. As best shown in the enlarged view of FIG. 2a, the end load arm includes a main body 302 and a cap 320. The main body also includes a spindle recess 312 and at least two cap fastener holes 304 disposed on a longitudinal end of the main body. The cap includes at least two through holes 322 constructed and arranged to receive at least two cap fasteners 324. In the embodiment depicted in FIG. 2, the main body includes four cap fastener holes and the cap includes four through holes arranged to receive four fasteners. Accordingly, the four cap fasteners are received by the through holes and the cap fastener holes to secure the cap to the main body. A spindle (not shown in the figure) of the door closer may be captured in the spindle recess formed in the main body by the cap. More specifically, the cap may function as a clamp to secure the spindle of door closer to the spindle recess of the end load arm. In some embodiments, the spindle recess may have a shape corresponding that of the spindle, such that rotational motion (i.e., torque) may be transmitted from the door closer to the end load arm and/or from the end load arm to the door closer. Accordingly, the end load arm may function as a coupling between any mounting hardware and the glass door rail.

Figure 2A:
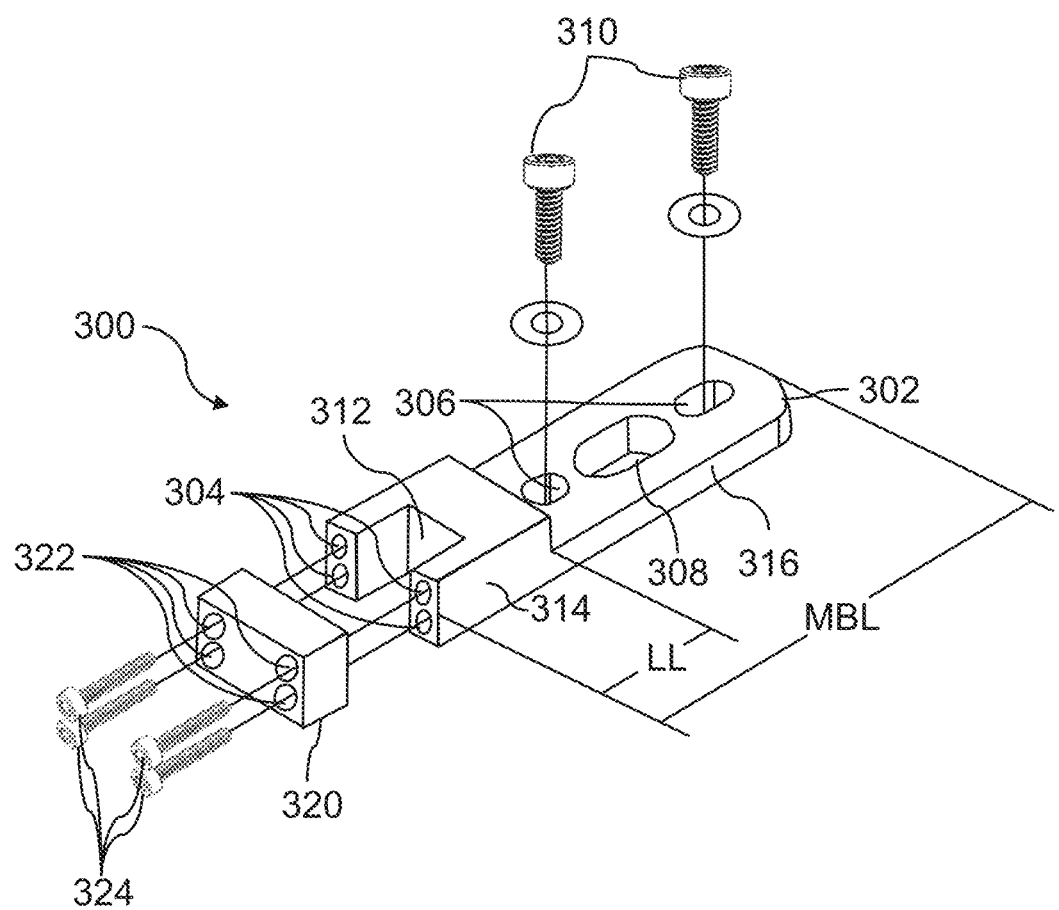
FIG. 2a is an enlarged view of the portion of the glass door rail assembly encircled by line 2a of FIG. 2.

As shown in FIGS. 2 and 2a, the main body 302 of the end load arm 300 may include at least one rail slot 306. The at least one rail slot may be constructed and arranged to receive at least one rail fastener 310. The at least one rail fastener may be arranged to secure the main body to a hardware channel 106 of a glass door rail 100. In some embodiments, the at least one rail slot is configured to allow longitudinal movement of the main body relative to the glass door rail. For example, the at least one rail fastener may be only partially inserted in the at least one rail slot to partially secure the main body to the glass door rail. When the at least one rail fastener is partially secured, the main body may be moved in a longitudinal direction (i.e., along the length of the rail) to adjust the position of the end load arm relative to the glass door rail. According to this example, the at least one rail fastener may be fully secured to the door rail through the at least one rail slot to secure the main body to the glass door rail such that the main body is stationary relative to the glass door rail once the fastener is adequately tightened. Of course, the at least one rail slot may be any suitable arrangement such that the main body may be secured to the glass door rail. As shown in the embodiment depicted in FIG. 2a, the main body may also include a door fastener slot 308 constructed and arranged to accommodate a door fastener 108. The door fastener slot may allow a door fastener protruding from the surface of the hardware channel to protrude through the main body such that the main body may be secured flush to the hardware channel. Additionally, the door fastener slot may allow an installer to access the door fastener with the end load arm is installed, such that the end load arm does not need to be removed to adjust, install, or remove an associated glass door pane.

Figure 3:
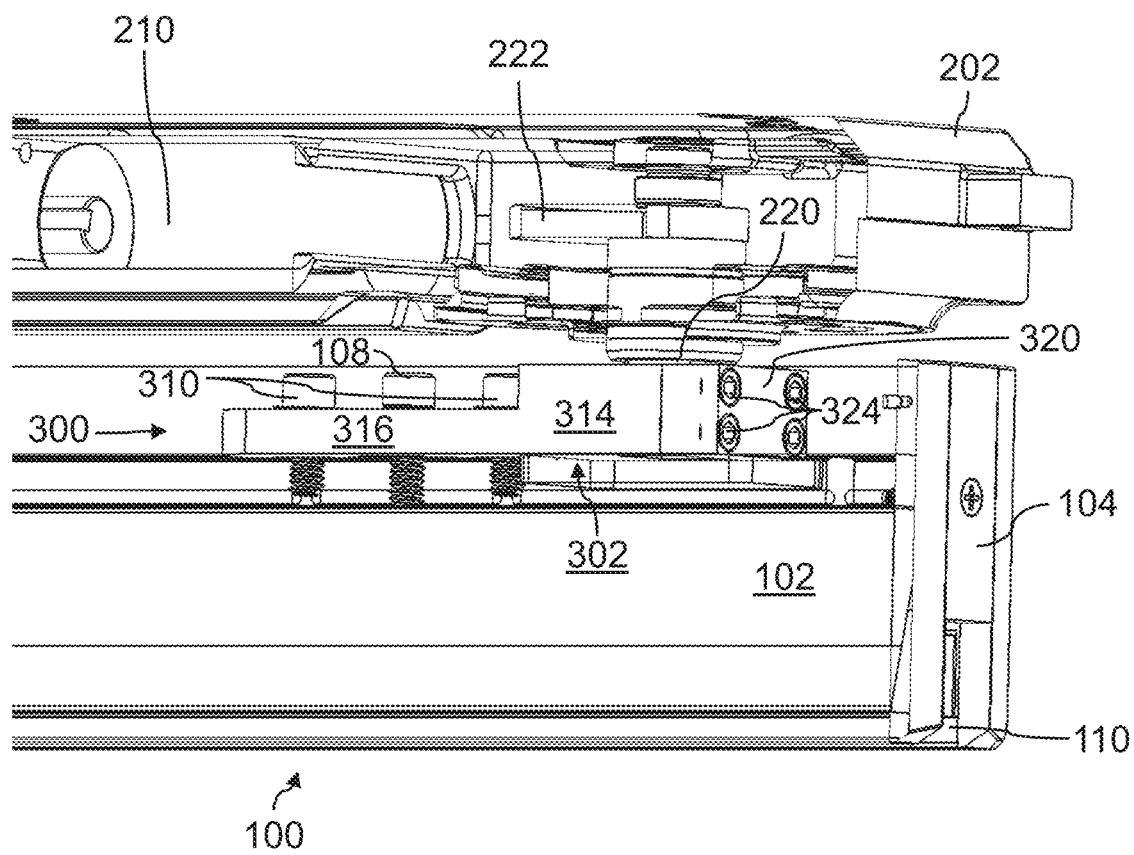
FIG. 3 is a perspective cutaway view of a portion of the glass door rail assembly taken along line 3-3 of FIG. 1.

FIG. 3 is a perspective cutaway view of the glass door rail assembly of FIG. 1 which includes the glass door rail 100 coupled to the door closer 200 through the end load arm 300. The end load arm includes a main body 302 and a cap 320. The glass door rail includes an end cap 104 and a side rail 102 which together form an exterior surface of the glass door rail. The glass door rail also includes a hardware channel and a glass channel 110, where the hardware channel may be configured to receive mounting hardware and the glass channel may be configured to receive a glass door pane. The end load arm is disposed inside the hardware channel of the glass door rail and secured to the glass door rail by at least one rail fastener 310 which extends through at least one rail slot 306 located in the main body. The cap is attached to the main body by at least two cap fasteners 324. As noted above, the spindle is constructed and arranged to project out of the casing and into the end load arm between the main body and the cap. That is, the spindle projects through a spindle recess (not shown in the figure) which has a substantially similar shape to that of the spindle, such that torque may be transmitted between the end load arm and the spindle. For example, the spindle may have a square shape, with the spindle recess having a roughly equivalent square shape such that torque may be transmitted between the spindle and the end load arm. Accordingly, the spindle projects through spindle recess and is secured in place using the cap and at least two cap fasteners, which function as a clamp to secure the spindle in the spindle recess. As shown in FIG. 3, the spindle and spindle lever are coupled together, such that any rotation of the spindle causes an equal rotation in the spindle lever. In some embodiments, one or more springs disposed in the at least one spring cylinder may resist changes in position of the spring lever. According to this embodiment, when a door is opened (i.e., rail, spindle, and spindle lever are rotated from a resting position relative to the door closer), the springs may resist and cause the door to close.

As shown in FIG. 2a, the main body 302 of the end load arm 300 includes a first section 314 and a second section 316. The first section is arranged on one longitudinal end of the end load arm to capture the spindle and the second section is arranged to mount to the door rail 100. The first section is constructed and arranged to have a height approximately equivalent to the height (i.e., distance of projection) of the spindle 220 of the door closer 200, such that the end load arm may substantially capture the whole height of the spindle. Without wishing to be bound by theory, such arrangement may promote better force and torque transmission between the end load arm and the door closer with less wear. Of course, the first section of the end load arm may have any suitable height such that the spindle of the door closer may be captured and secured such that force and torque may be transmitted between the end load arm and the door closer. The lower portion may have a height suitable to accommodate a head or other protruding portion of at least one rail fastener 310. Of course, the lower portion may have any suitably low height such that the at least one rail fastener may be disposed below an uppermost region of the glass door rail 100, such the at least one rail fastener may be hidden from view. The lower portion of the main body may have a length "LL" which is lesser than that of a maximum length of the main body "MBL". In some embodiments, the ratio between the length "LL" and length "MBL" may be between 1:5 and 2:5, or approximately equal to 1:5, or approximately equal to 2:5. Without wishing to be bound by theory, such a ratio may have suitably high strength to withstand the loads of normal glass door operation with a low profile glass door rail.

In some embodiments, the end load arm may cooperate with a glass door rail to simplify the installation of a glass door. More specifically, the end load arm may simplify the process of coupling a glass door rail to mounting hardware (e.g., a door closer) positioned in an associated door frame. For example, a door closer may be installed separately from the glass door rail and end load arm in an associated door frame, such that the door closer is substantially flush (i.e., recessed within) the associated door frame except for a spindle which projects out of the door closer. The glass door rail may be installed on a glass door pane, where the glass door pane is inserted in a glass slot of the glass door rail. One or more door fasteners may be manipulated to secure the glass door pane in the glass door rail, such that the glass door rail is substantially stationary relative to the glass door pane. A main body of the end load arm may be installed in a hardware channel of the glass door rail with at least one rail fastener and secured, such that the main body, glass door rail, and glass door pane all act as a single object for installation. During installation, a cap of the end load arm may be partially or fully removed, such that a spindle recess in the main body is accessible to receive the spindle from the door closer. Additionally, an end cap of the door rail may be removed, such that an installer has access to at least two cap fasteners that secure the cap to the main body. The at least two cap fasteners may be a screw, bolt, or any other suitable fastener which may be manipulated by a wrench, driver, or other suitable tool to selectively secure the cap to the main body with the at least two cap fasteners. According to the arrangement described above, the main body, glass door rail, and glass door pane may be positioned by an installer such that the spindle is positioned in the spindle recess of the end load arm. Once the spindle is positioned in the main body of the end load arm, the cap may be secured to the main body with the at least two cap fasteners to capture the spindle in the spindle recess to secure the door closer to the end load arm. Accordingly, once the cap is secured to the main body, the spindle may remain substantially stationary relative the end load arm, such that any torques or other forces may be transmitted between the end load arm and the spindle. After the spindle has been secured to the end load arm, the end cap of the glass door rail may be replaced and secured, such that the end cap and a side rail of the glass door rail form an exterior surface and any components in the hardware channel are substantially hidden. In some embodiments, the glass door rail, glass door pane, and end load arm may be installed at an angle of 90 degrees to the doorway, such that the doorway remains accessible during installation. Of course, the glass door rail, glass door pane, and end load arm may be installed in any suitable order or angle relative to the doorway, as the present disclosure is not so limited.

Figure 4:
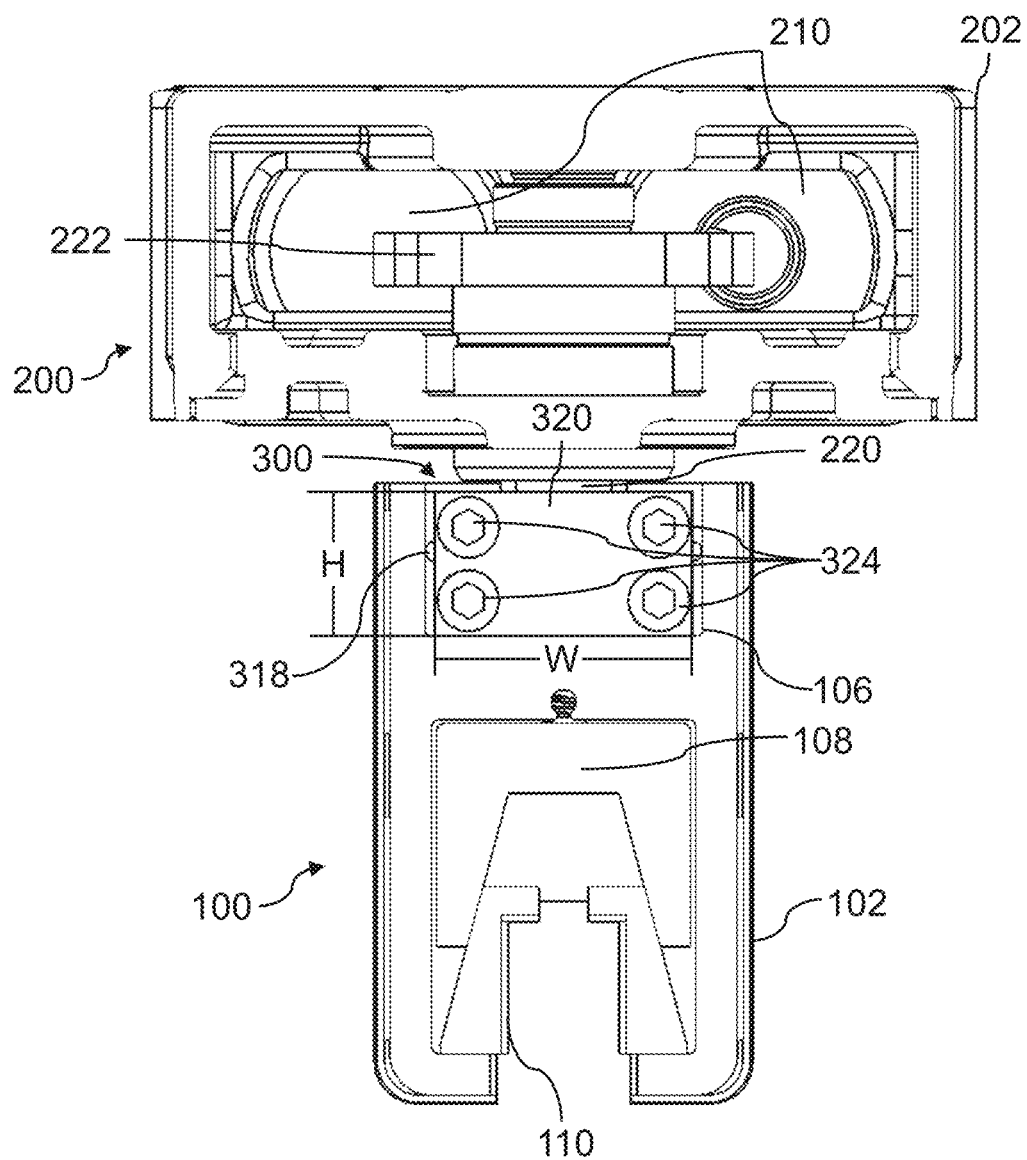
FIG. 4 is a transverse cross-sectional view of the glass door rail assembly taken along line 4-4 of FIG. 1.

FIG. 4 is a transverse cross-sectional view of the glass door rail assembly taken along line 4-4 of FIG. 1 which shows the glass door rail 100, door closer 200, and end load arm 300. In the embodiment depicted in FIG. 4, the one or more door fasteners 108 are constructed and arranged as an adjustable clamp, where manipulating the one or more door fasteners adjusts the width of the glass slot 110. Accordingly, a glass door pane may be placed into the glass slot and secured in place by manipulating the one or more door fasteners. Of course, the one or more door fasteners may have any suitable configuration such that the glass door may be received by the glass door slot and secured. As best seen in FIG. 4, the end load arm is disposed in the hardware channel 106. Accordingly to this embodiment, the end load arm has a maximum height "H" which is less than or approximately equal to a depth of the hardware channel. Accordingly, the end load arm may be hidden from view during normal operation of an associated glass door. The end load arm may also have a maximum width "W" which may be less than a width of the hardware channel. In the embodiments depicted in FIG. 4, a spacer 318 is fit between the end load arm and the hardware channel to accommodate any space between the two. In some embodiments, the maximum width "W" of the end load arm may be approximately equal to the width of the hardware channel. That is, the end load arm may be closely fit with the hardware channel such that the end load arm is fixed rotationally relative to the door rail about at least one axis. Such an arrangement may improve torque transmission and reduce wear on one or more door fasteners securing the end load arm to the glass door rail. Without wishing to be bound by theory, torques applied from the door or door closer may be transmitted through the sides of the end load arm directly to the glass door rail rather than as a shear load in the one or more door fasteners. Accordingly, wear on the end load arm and one or more door fasteners during normal operation of a glass door may be reduced.

In some embodiments, a maximum height "H" of an end load arm and a maximum width "W" of an end load arm may have a suitable ratio such that the end load arm may be employed in low-profile door rails. According to this embodiment, the ratio between a maximum height of the end load arm and a maximum width of the end load arm is between 2:5 and 3:5, or approximately equal to 2:5, or approximately equal to 3:5. Without wishing to be bound by theory, such an arrangement may have suitable strength to withstand the forces encountered during normal operation of a glass door while allowing the end load arm to be used in low-profile glass door rails.

Figure 5:
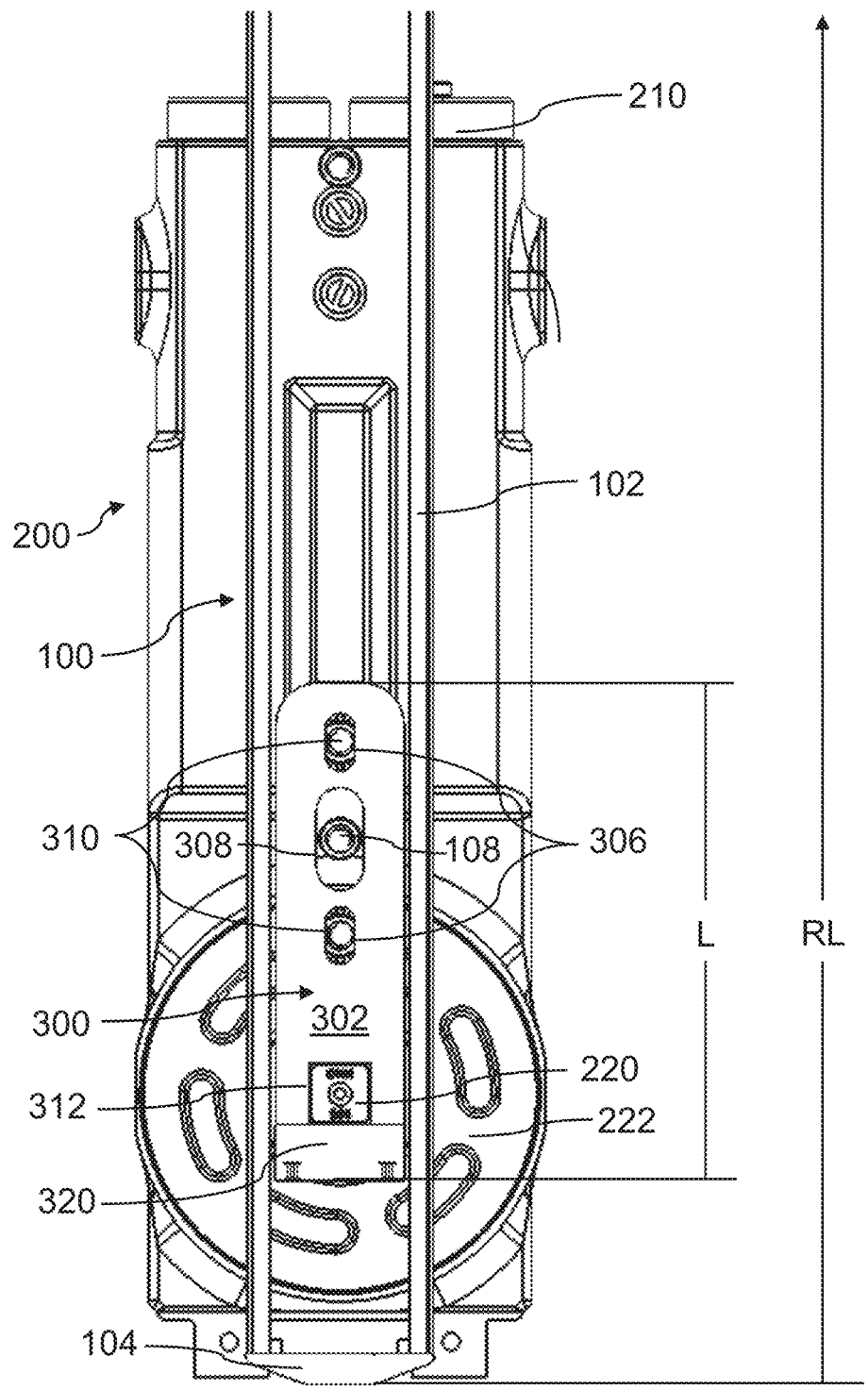
FIG. 5 is a bottom cross-sectional view of a portion of the glass door rail assembly taken along line 5-5 of FIG. 1.

FIG. 5 is a bottom cross-sectional view of a portion of the glass door rail assembly taken along line 5-5 of FIG. 1. As shown in FIG. 5, the spindle 220 of the door closer is captured in the spindle recess 312 formed in longitudinal end of the main body 302. The spindle recess is formed as a shape complementary to the shape of the spindle, such that torque may be transmitted between the spindle and the end load arm. The main body of the end load arm also includes at least one rail slot 306 and a door fastener slot 308. The at least one rail slot is constructed and arranged to receive at least one rail fastener and allow longitudinal adjustment of the main body relative to the glass door rail. Similarly, the door fastener slot may be constructed and arranged to receive a door fastener disposed on the glass door rail and allow the main body to be adjusted longitudinally relative to the glass door rail. According to the embodiment depicted in FIG. 5, the at least one rail fastener may be loosened to allow the main body to be shifted longitudinally to make adjustments. Once the main body is moved longitudinally to a suitable position, the at least one rail fastener may be tightened such that the end load arm is secured to the glass door rail and remains substantially stationary related to the glass door rail. Of course, the at least one rail slot and door fastener slot may have any suitable arrangement such that the at least one rail fastener and door fastener may be received and the main body may be adjusted longitudinally.

In some embodiments, the end load arm may have a suitably small length relative to the length of the glass door rail. As shown in FIG. 5 (and as shown in FIG. 1), the end load arm may have a maximum length "L" which is taken along a longitudinal axis of the end load arm. Similarly, the glass door rail may have a maximum length "RL" (a portion of which is shown in FIG. 5) which is taken along a longitudinal axis of the glass door rail. In some embodiments, a ratio between a maximum length of the end load arm and a maximum length of a glass door rail may be between 1:20 and 3:20, or approximately equal to 1:20, or approximately equal to 3:20. In some embodiments, the end load arm may have a maximum length approximately equal to 5.125 inches. Of course, the end load arm may have any suitable length such that the end load arm may transmit torque and other forces between a glass door rail and any mounting hardware, as the present disclosure is not so limited.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. An end load arm for a glass door rail, the end load arm comprising:
   a main body including at least two cap fastener holes located on a longitudinal end of the main body, wherein the main body further includes at least one rail slot, the rail slot constructed and arranged to receive a rail fastener and permit longitudinal adjustment of the main body relative to the glass door rail;
   a cap including at least two through holes; and
   at least two cap fasteners, each constructed and arranged to be received by a corresponding one of the at least two through holes and by a corresponding one of the at least two cap fastener holes to attach the cap to the main body,
   wherein a ratio between a height of the end load arm and a width of the end load arm is between 2:5 and 3:5 or approximately equal to one of 2:5 and 3:5.

2. The end load arm of claim 1, wherein the main body includes four cap fastener holes, wherein the cap includes four through holes, and wherein the end load arm comprises four cap fasteners.

3. The end load arm of claim 1, wherein the main body includes a spindle recess positioned at the longitudinal end of the main body, wherein the at least two cap fastener holes are located on opposite sides of the spindle recess.

4. The end load arm of claim 3, wherein the main body includes at least four cap fastener holes, and wherein at least two cap fastener holes are located on opposite sides of the spindle recess.

5. The end load arm of claim 1, wherein a ratio between a length of the end load arm and a length of the glass door rail is between 1:20 and 3:20 or approximately equal to one of 1:20 and 3:20.

6. The end load arm of claim 5, wherein the length of the end load arm is less than or approximately equal to 5.125 inches.

7. The end load arm of claim 1, wherein the width of the end load arm is approximately equal to an interior width of the glass door rail, such that the door rail substantially prevents rotation of the end load arm in at least one direction.

8. The end load arm of claim 1, wherein the main body further includes a door fastener slot, the door fastener slot constructed and arranged to receive a door fastener disposed on the glass door rail.

9. The end load arm of claim 1, wherein the main body and the cap are formed of stainless steel.

10. An end load arm for a glass door rail, the end load arm comprising:
    a main body including at least two cap fastener holes located on a longitudinal end of the main body, wherein the main body further includes at least one rail slot, the rail slot constructed and arranged to receive a rail fastener and permit longitudinal adjustment of the main body relative to the glass door rail;
    a cap including at least two through holes; and
    at least two cap fasteners, each constructed and arranged to be received by a corresponding one of the at least two through holes and by a corresponding one of the at least two cap fastener holes to attach the cap to the main body,
    wherein the main body further includes a first section forming the longitudinal end of the main body configured to capture a spindle, and a second section configured to mount to the glass door rail, and wherein a ratio between a length of the first section and a length of the main body is between 1:5 and 2:5 or approximately equal to one of 1:5 and 2:5.

11. The end load arm of claim 10, wherein the main body includes four cap fastener holes, wherein the cap includes four through holes, and wherein the end load arm comprises four cap fasteners.

12. The end load arm of claim 10, wherein the main body includes a spindle recess positioned at the longitudinal end of the main body, wherein the at least two cap fastener holes are located on opposite sides of the spindle recess.

13. The end load arm of claim 12, wherein the main body includes at least four cap fastener holes, and wherein at least two cap fastener holes are located on opposite sides of the spindle recess.

14. The end load arm of claim 10, wherein a ratio between a length of the end load arm and a length of the glass door rail is between 1:20 and 3:20 or approximately equal to one of 1:20 and 3:20.

15. The end load arm of claim 14, wherein the length of the end load arm is less than or approximately equal to 5.125 inches.

16. The end load arm of claim 10, wherein a width of the end load arm is approximately equal to an interior width of the glass door rail, such that the door rail substantially prevents rotation of the end load arm in at least one direction.

17. The end load arm of claim 10, wherein the main body further includes a door fastener slot, the door fastener slot constructed and arranged to receive a door fastener disposed on the glass door rail.

18. The end load arm of claim 10, wherein the main body and the cap are formed of stainless steel.

* * * * *